June 17, 1958 R. L. VICK 2,838,911
COMBINATION MASTER CYLINDER AND POWER BRAKE VALVE
Filed Oct. 18, 1954 2 Sheets-Sheet 1

INVENTOR.
Ralph L. Vick
BY
ATTORNEY

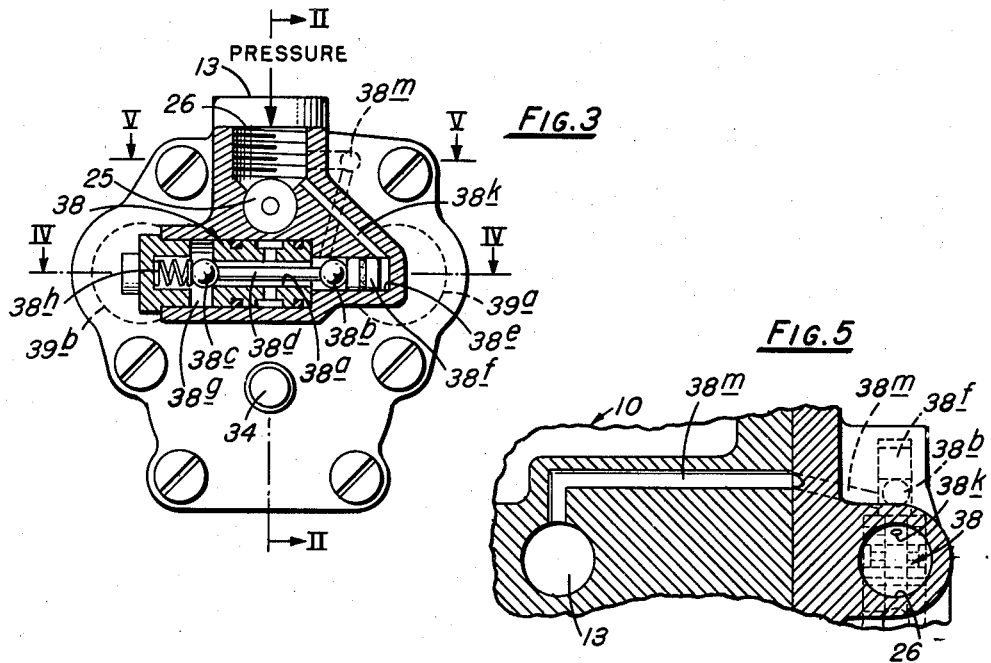
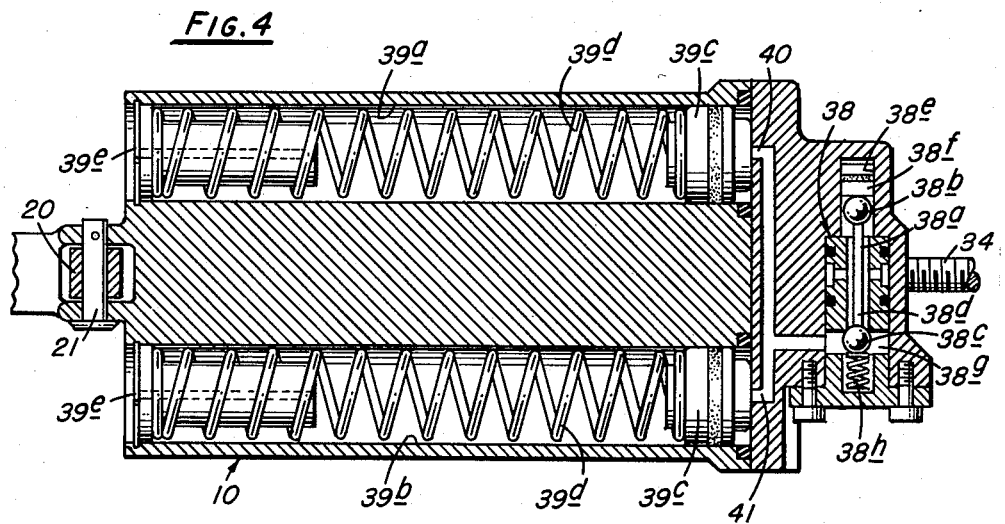

United States Patent Office 2,838,911
Patented June 17, 1958

2,838,911

COMBINATION MASTER CYLINDER AND POWER BRAKE VALVE

Ralph L. Vick, Granada Hills, Calif., assignor to Bendix Aviation Corporation, North Hollywood, Calif., a corporation of Delaware Application October 18, 1954, Serial No. 462,936

6 Claims. (Cl. 60—54.6)

This invention relates to hydraulic brake systems in which the pressure fluid is ordinarily delivered from a power source (pump or accumulator) through a power brake valve to the brakes, but in which a master cylinder is provided for emergency operation when power fluid is not available.

It is customary in such devices to permanently mechanically connect the master cylinder piston to the brake-actuating pedal or hand lever and provide automatic means for causing movement of the pedal to actuate the power brake valve when power fluid is available and to deliver fluid from the master cylinder to the brakes when power fluid is not available.

An object of the invention is to provide a simple and practicable combination master cylinder and power brake valve having the high continuous flow capabilities of a simple power brake valve, and in which the power brake valve is quickly responsive to changes in the force applied to the brake pedal, or, in other words, has low hysteresis.

Another object is to provide substantially the same range of and resistance to movement of the brake pedal during power braking, as during manual braking.

Other more specific objects and features of the invention will become apparent from the description to follow, with reference to the drawing.

In the drawing:

Fig. 3 is an end view looking at the right end of Fig. 2 with a portion shown in section, the section being in the plane III—III of Fig. 2.

Fig. 4 is a longitudinal sectional view taken in the plane IV—IV of Fig. 3.

Fig. 5 is a detail section in the plane V—V of Fig. 3.

Figure 1:
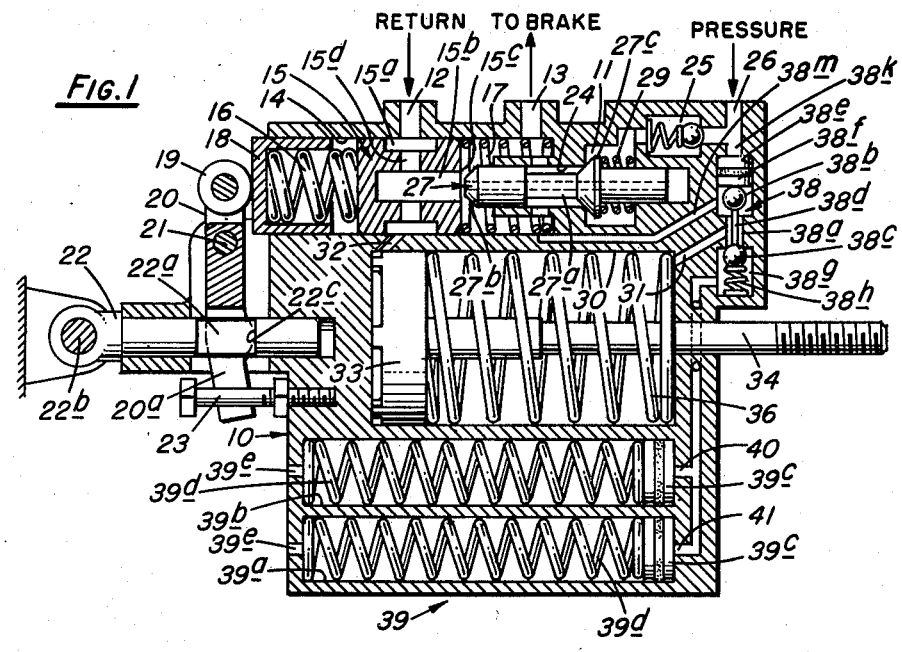
Fig. 1 is a schematic diagram showing the principles of operation of the invention.
Figure 2:
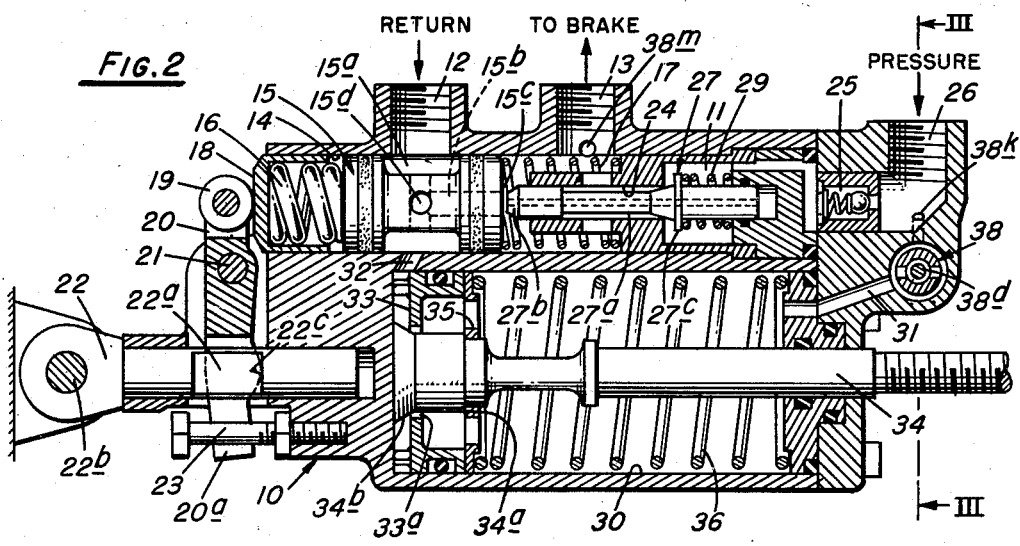
Fig. 2 is a longitudinal section through a practical embodiment of the invention taken in the plane II—II of Fig. 3.

Essentially, a master cylinder and power brake valve assembly in accordance with the invention comprises a casing 10 containing a power brake valve mechanism (shown in the upper portion of Figs. 1 and 2), a master cylinder, and an accumulator.

The brake valve mechanism comprises a power pressure inlet chamber 11, an exhaust port 12, and a delivery port 13, and a valve means movable from an "off" position, in which it connects the delivery port 13 to the exhaust port 12, into an "on" position, in which it transfers connection of the delivery port 13 to the pressure inlet port 11.

Specifically, this valve means comprises a cylinder 14 in the casing 10, in which a shuttle piston 15 is fitted for sliding movement in sealing relation. The piston 15 has an external annular recess 15a registering at all times with the exhaust port 12 and having an internal recess 15b which is closed at its left end, but is open at its right end, defining a valve seat 15c. The recess 15b is communicated with the external annular recess 15a by radial passages 15d. The shuttle piston 15 is normally retained in the position shown in Figs. 1 and 2 by a pair of opposed helical compression springs 16 and 17, respectively. The spring 17 is interposed between the right end of the piston 15 and the right end of the cylinder 14. Spring 16 is substantially stiffer than spring 17 and is interposed between the left end of piston 15 and a slide 18 which is slidable in and protrudes from the left end of the cylinder 14.

Outward movement of the slide 18 is limited by contact with a roller 19 on one end of a lever 20 which is fulcrumed near its center by a pin 21 to the casing 10 and is bifurcated at its other end to straddle a narrow portion 22a of an anchor rod 22. The narrow portion 22a is formed by milling away opposite sides of the rod, leaving shoulders 22c against which the prongs 20a of the bifurcated end of the lever bear. The anchor rod 22 is slidable longitudinally in the casing 10 and has an eye 22b at its outer end for connection to a suitable anchoring support. The entire assembly is supported by the rod 22 and the piston rod of the master cylinder (to be described later) so that when traction is applied to master piston rod the casing 10 tends to move with the rod, and the anchor rod 22 applies a force to the lever 20 tending to rock it clockwise about its fulcrumed pin 21 and to depress the slide 18 to urge the shuttle piston 15 to the right.

The right end of the valve cylinder 14 is in constant communication with the delivery port 13 and is also communicated by a bore 24 with the pressure inlet chamber 11 which is communicated by a check valve 25 with a main pressure fluid port 26. A sliding valve 27 is positioned in the bore 24. It has a reduced midsection 27a communicating with the right end of cylinder 14 in all positions, a poppet 27b on its left end adapted to seat against the seat 15c and a poppet 27c at the right end of the reduced section 27a adapted to seat against the right end of the bore 24 and thereby block communication between the right end of cylinder 14 (which is connected with the delivery port 13) and the pressure inlet chamber 11.

Under normal conditions, when there is no stress developed between the valve casing 10 and the anchor rod 22 the power brake valve is in the condition shown in the drawing, in which the poppet 27c is closed against the right end of the bore 24 by a spring 29, thereby blocking communication between the pressure inlet chamber 11 and the delivery port 13, while connecting the latter through the passage 15b with the exhaust port 12. As an increasing tensile stress is developed between the casing 10 and the anchor rod 22, the lever 20 rocks clockwise to depress the slide 18 and first move the valve piston 15 to engage the seat 15c thereon with the poppet 27b, thereby disconnecting the delivery port 13 from the exhaust port 12, after which further movement of the piston 15 carries the sliding valve 27 with it to disengage the poppet 27c from the right end of the bore 24 and permit flow of pressure fluid from the chamber 11 to the delivery port 13. The check valve 25 permits flow of pressure fluid from the main port 26 to the chamber 11, but prevents escape of pressure fluid from the chamber 11 when there is no pressure in the port 26.

A limit screw 23 extends between the prongs 20a and into a threaded hole provided therefor in the casing 10. The head of the screw 23 is in the path of the prongs 20a and limits the brake-applying movement of the lever 20 to a desired extent, depending upon the maximum pressure it is desired to develop in the delivery port 13. An increase in the delivery port pressure above the maximum value determined by the adjustment of screw 23 compresses spring 16 to move the valve seat 15c away from the poppet 27b and permit fluid to escape from the delivery port 13 to the exhaust port 12.

There is positioned within the casing 10 below the power brake valve the master cylinder 30 having a delivery port 31 at its right end and having an inlet port 32 at its left end. A master piston 33 is reciprocable in the cylinder 30 and has connected thereto a piston rod 34 which is aligned with the anchor rod 22 and extends through an aperture provided therefor in the right end of the casing 10 to the exterior, where it can be connected by any suitable linkage to a brake pedal or a manual control handle. In accordance with usual practice, the piston 33 is slidable on the piston rod 34 which projects beyond the left end of the piston where it constitutes a poppet sealing and opening 33a in the piston. A spring retainer 35 is slidably mounted on the piston rod 34 and bears against a shoulder 34a thereon when the poppet end 34b is closed against the end of orifice 33a. Spring 36 is compressed between the spring retainer 35 and the right end of the master cylinder 30. During forward movement of the piston rod 34, pressure is developed against the right side of the piston 33, causing it to bear against and be sealed by the poppet end 34b of the rod. However, when the rod 34 is returned to the left by the spring 36, the piston 33 moves away from the poppet end 34b into contact with the spring retainer 35, thereby permitting fluid to flow from the left end of the cylinder past the piston into the right end of the cylinder, and thereby permit "pumping" the brakes by rapid actuation of the brake pedal.

The master cylinder inlet port 32 is constantly connected to the exhaust port 12, which contains low pressure fluid. The master cylinder discharge port 31 is connected by transfer valve 38 through passage 38m to the main delivery port 13 when no power pressure fluid is present in the pressure port 26, and to the accumulator 39 when power pressure fluid is present. Thus, the transfer valve 38 consists of a bore 38a in the casing which is in communication intermediate its ends with the master cylinder outlet port 31 and is adapted to be closed at one or the other of its opposite ends by ball poppets 38b and 38c. A spacer 38d extends between the poppets 38b and 38c and serves to always keep one poppet off its seat when the other poppet is seated. Mounted in a cylinder 38e back of poppet 38b is a piston 38f, and the outer end of the cylinder 38e is connected directly to the pressure port 26 by passage 38k, so that whenever sufficient pressure exists in that port it moves the piston 38f to close the poppet 38b against its seat and open the poppet 38c off its seat. A spring 38h acting against the poppet 38c serves to keep it closed on its seat when pressure is not present to actuate the piston 38f.

Poppet 38c is positioned in a chamber 38g which is connected by passages 40 and 41 with the accumulator 39 which is formed in two sections to provide a more compact over-all assembly. Thus, this accumulator consists of two identical cylinders 39a and 39b mounted alongside the master cylinder 30 on opposite sides of the power brake valve mechanism. Each cylinder contains a piston 39c which is urged into one end position by a compression spring 39d. The other end of each cylinder is vented as indicated at 39e.

The device described operates as follows: When power pressure is not available in the port 26, the transfer valve 38 is in the position shown in Fig. 1, in which the master cylinder delivery port 31 is connected to the main delivery port 13, so that application of traction to the master piston rod 34 pumps fluid directly through the master cylinder discharge port 31 past the transfer valve poppet 38b and passage 38m to the delivery port 13 and thence to the brake line. The force applied to the master piston rod 34 tends to move the casing 10 to the right, and this force is resisted by the anchor rod 22, which rocks the lever 20 to actuate the power brake valve into position disconnecting the delivery port from the exhaust port 12 and connecting it to the pressure inlet chamber 11. This prevents the fluid delivered to the delivery port 13 from the master cylinder from escaping into the exhaust port 12. The pressure of this fluid is applied to the pressure inlet chamber 11, but fluid cannot escape from this chamber past the check valve 25. Hence, the assembly functions as an ordinary master cylinder.

When pressure is present in the pressure inlet port 26 and passage 38k it acts against the piston 38f of the transfer valve 38 to close the poppet 38b on its seat and open the poppet 38c off its seat. Under these conditions, movement of the master piston rod 34 delivers fluid from the master cylinder delivery port 31 into the accumulator 39. The volume of the accumulator and the stiffness of the accumulator springs 39d are so chosen that as fluid is delivered to the accumulator, the pressure rises gradually with movement of the master piston, so that the latter moves through an appreciable distance, thereby simulating the reaction on the piston rod 34 produced during manual operation of the brakes. As soon as the force applied to the piston rod 34 reaches a predetermined value, the reaction force of the anchor rod 22 actuates the power brake valve in the manner heretofore described to disconnect the main delivery port 13 from the exhaust port 12 and connect it to the pressure inlet chamber 11, which at this time contains high pressure fluid from the power source. As pressure fluid flows past the poppet 27c into the right end of the valve cylinder 14, it acts against the pressure face of the piston 15, opposing the opening force of the latter and closing the poppet 27c against its seat, thereby requiring an increased force on the piston rod 34. This simulates the reaction that is experienced during manual operation.

When tension is removed from the piston rod 34, the power brake valve restores to its normal position, thereby connecting the delivery port 13 to the exhaust port 12 and permitting the pressure in the delivery line to dissipate.

It is to be understood that the accumulator 39 is not essential to operation of the system, but provides a pedal reaction simulating the pedal reaction that exists during manual operation. If the accumulator were eliminated, together with the lines 40 and 41 and the poppet 38c, the power brake valve would still function in the manner described, but a very slight movement of the piston rod 34 would suffice to actuate the power brake valve. Hence, the actuating pedal or manual handle would meet a sudden extremely high resistance, substantially preventing further movement thereof. This would give the operator a radically different reaction from that he obtains during manual operation, and would make it difficult for him to accurately control the braking effect during both manual and power actuation.

It has been previously stated that an object of this invention is to provide a combination master cylinder and power brake valve in which the power brake valve is quickly responsive to changes in the force applied to the brake pedal, or, in other words, has low hysteresis. This is accomplished in large measure by actuating the power valve mechanically in response to tensile stress between the anchor rod 22 and the casing 10. This stress is equal to the force applied by the pedal to the piston rod 34 and is not adversely affected by frictional resistance to movement of the master piston in the master cylinder. Hysteresis is further reduced by making the lever arm between the fulcrum pin 21 and the anchor rod 22 longer than the lever arm between the fulcrum 21 and the valve-actuating roller 19. This provides a mechanical advantage which produces a force on the slide 18 greater than the pedal force applied to the piston rod 34. The effect is to increase the ratio of the actuating forces to the frictional resistance to movement of the power brake valve.

The spring 38h in the transfer valve 38 is made stiff enough to seat the poppet 38c against the highest pressure that can be developed in the master cylinder, so that fluid therefrom cannot be delivered to the accumulator 39 during manual operation.

Although for the purpose of explaining the invention, a particular embodiment thereof has been shown and described, obvious modifications will occur to a person skilled in the art, and I do not desire to be limited to the exact details shown and described.

I claim:

1. In combination: a power brake valve having a power pressure inlet chamber, an exhaust port, a delivery port, and valve means movable from an "off" position in which it connects said delivery port to said exhaust port to an "on" position in which it transfers connection of said delivery port from said exhaust port to said pressure inlet chamber, said valve means having a pressure face exposed to delivery port pressure for opposing movement thereof into "on" position; a master cylinder having a delivery port and a master piston movable in response to manual force applied thereto to deliver fluid from said port; valve actuating means mechanically responsive to the reaction force opposing manual force applied to said master piston for urging said valve means toward "on" position with a force proportional to the reaction force resisting movement of said master piston in said cylinder; an inlet pressure port, and check valve means connecting it to said pressure inlet chamber for flow thereinto; and pressure-responsive valve means normally connecting said master cylinder delivery port to said power valve delivery port and disconnecting said delivery ports from each other in response to a pressure in said pressure inlet port exceeding the pressure in said brake valve delivery port.

2. Apparatus according to claim 1, including accumulator means for receiving fluid in response to increasing pressure and discharging fluid in response to decreasing pressure, and valve means coordinated with said pressure-responsive valve means for connecting said master cylinder delivery port to said accumulator means when it is disconnected from said brake valve delivery port.

3. Apparatus according to claim 1 including a unitary casing defining said power brake valve and said master cylinder; a piston rod extending from said master piston through one end of said casting; an anchor rod extending from the opposite end of and movable with respect to said casing, said piston and anchor rods constituting physical supports for said casing whereby the casing is free to move with respect to the anchor rod in response to force applied to said piston rod; said valve-actuating means including said casing, anchor rod and means mechanically coupling said casing, anchor rod and valve means together for applying to said valve means a force urging it in "on" direction proportional to a force developed between said casing and anchor rod.

4. Apparatus according to claim 3 in which said coupling means comprises a lever interconnecting said casing, anchor rod and valve means.

5. Apparatus according to claim 4 in which said lever is proportioned to provide a longer lever arm between its casing and anchor rod connections than between its casing and valve means connections.

6. Apparatus according to claim 3 including stop means for limiting movement of said casing with respect to said anchor rod in response to forces applied to said casing by said piston rod in excess of a predetermined magnitude.

References Cited in the file of this patent

UNITED STATES PATENTS

| | | |
|---|---|---|
| 1,987,435 | Engel | Jan. 8, 1935 |
| 2,343,698 | Parnell | Mar. 7, 1944 |
| 2,524,012 | Groebe | Sept. 26, 1950 |
| 2,569,028 | Stryker | Sept. 25, 1951 |
| 2,662,377 | Miller | Dec. 15, 1953 |
| 2,670,004 | Deardorff et al. | Feb. 23, 1954 |
| 2,676,465 | Gladden | Apr. 27, 1954 |
| 2,696,827 | Deardorff et al. | Dec. 14, 1954 |
| 2,702,455 | Erle | Feb. 22, 1955 |